Nov. 4, 1952 W. H. DU BOIS 2,616,525
WHEEL AND BRAKE ASSEMBLY
Filed Nov. 18, 1947 2 SHEETS—SHEET 1

INVENTOR.
WILLIAM H. DuBOIS
BY
T. J. Plante
ATTORNEY

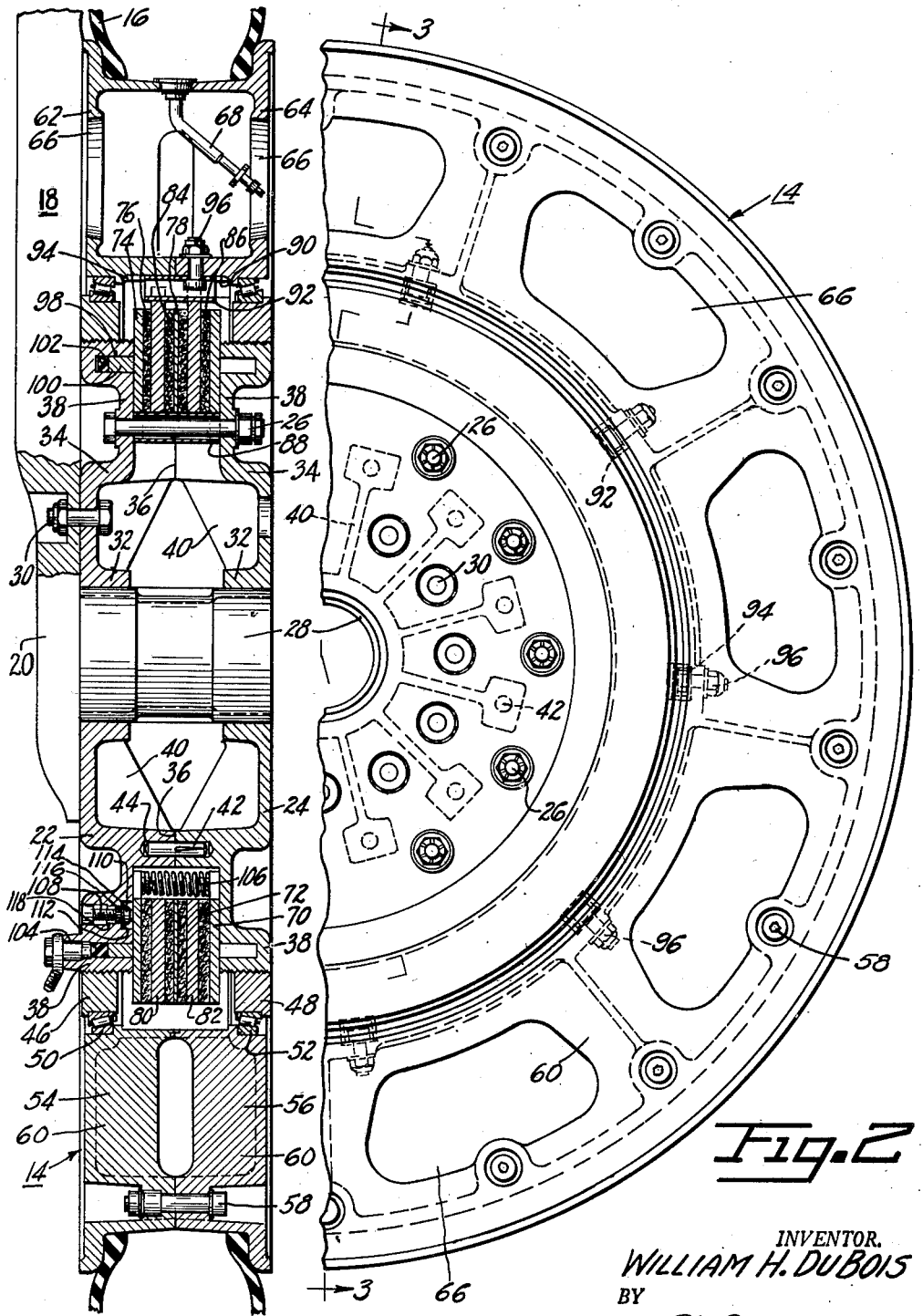

Patented Nov. 4, 1952

2,616,525

UNITED STATES PATENT OFFICE 2,616,525

WHEEL AND BRAKE ASSEMBLY

William H. Du Bois, South Bend, Ind., assignor to Bendix Aviation Corporation, South Bend, Ind., a corporation of Delaware Application November 18, 1947, Serial No. 786,720

23 Claims. (Cl. 188—18)

This invention relates to a wheel and brake assembly which is particularly intended for, although not limited to, use in the landing gear of an airplane.

The development of jet-propelled airplanes having exceptionally high flying speeds necessitates the use of very thin wings, in order to minimize the drag due to air resistance. This reduction in wing section increases the difficulty of providing landing gear which can be retracted into the wings during flight.

The primary object of the present invention is to provide a wheel and brake assembly which is very narrow and which is capable of being housed in a thin-section wing, without sacrificing the strength of the wheel.

The most important characteristics of the present invention, which permit accomplishment of the foregoing object, are (1) utilization of the same carrier, or supporting member, for both the wheel and the brake, (2) location of the brake in a cavity provided in the center of the carrier, and (3) mounting of the wheel on bearings provided on the periphery of the carrier, the bearings being located radially outwardly beyond the brake. Because the brake is located in the plane of the wheel, but radially inwardly with respect to the hub of the wheel, the usual additive tendency of wheel width and brake width is avoided.

The above and other objects and features of the invention will appear more fully hereinafter from a consideration of the following description, taken in connection with the accompanying drawings, wherein an embodiment of the invention is illustrated by way of example. In the drawings, in which like numerals are used to designate like parts in the several views:

Figure 2 is a partial side view of the wheel and brake assembly; and

Figure 3 is a section taken on the line 3—3 of Figure 2.

Figure 1:
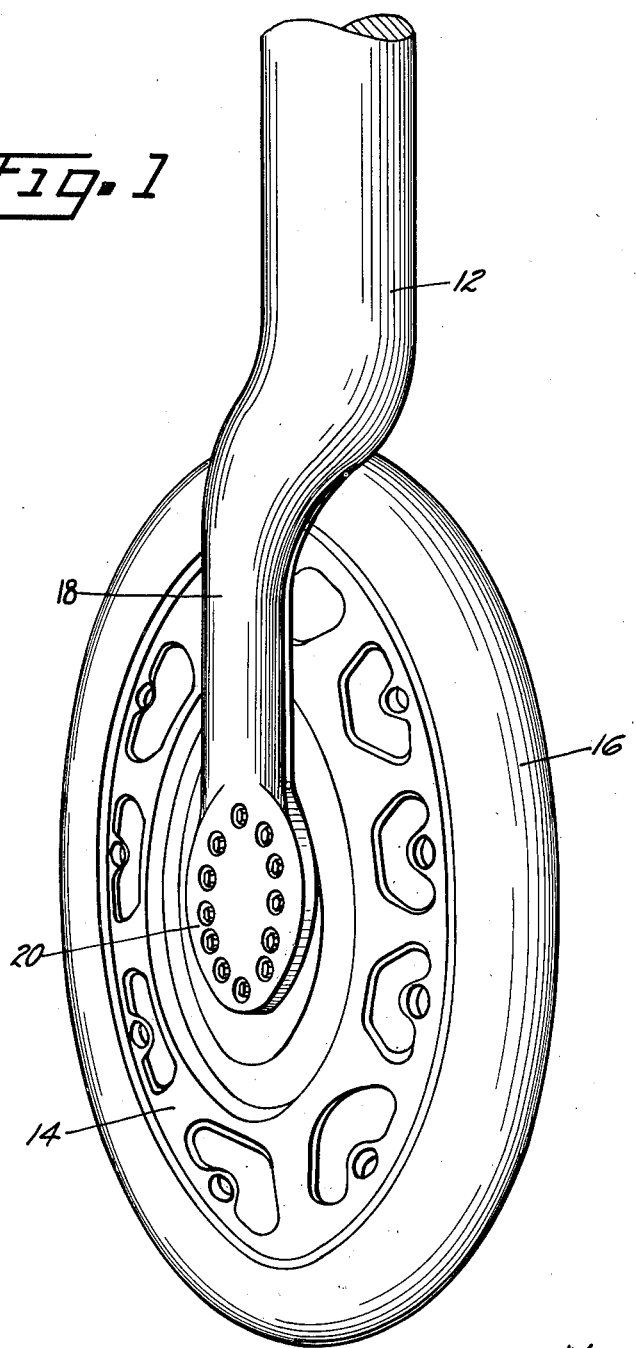
Figure 1 is a front view of the lower portion of an airplane landing gear, which includes my novel wheel and brake assembly.

Referring to the drawings, and particularly to Figure 1, the landing gear consists of a strut 12, and a wheel 14 carried by the lower end of the strut and provided with a tire 16. The lower end of the strut is a flattened leg 18 of minimum thickness. The leg 18 of the strut has a mounting flange 20, to which the wheel-supporting structure is secured.

Referring now to the details of the wheel and brake assembly, as disclosed in Figures 2 and 3, the supporting structure for both the brake and the wheel, which constitutes the torque-reaction member of the brake and also the carrier for the bearings on which the wheel rotates, consists of two supporting members 22 and 24 which are secured together by a plurality of angularly-spaced fastening members, or bolts, 26 and which are mounted on the stub axle 28. The stub axle 28 is welded, or otherwise secured, to the strut leg 18, and extends through openings provided in the center of supporting members 22 and 24. In addition to being mounted on the stub axle, the wheel and brake supporting structure is secured directly to the mounting flange 20 by means of a plurality of bolts 30 which fasten supporting member 22 to the flange.

The two supporting members 22 and 24, which are preferably substantially alike in construction in order to reduce manufacturing costs, have inner portions 32, which engage the stub axle; intermediate portions 34, which have surfaces 36 engaging one another; and outer portions 38, each of which has a generally plate-like structure, and which are spaced to form a brake cavity. The inner portions 32 of the two supporting members may be hollow, as shown, to reduce weight, and may be provided with a plurality of axially-extending angularly-spaced strengthening ribs 40. The engaging surfaces 36 of the intermediate portions 34 are held in engagement by the bolts 26, which secure the two supporting members together. That part of the brake torque which is absorbed by supporting member 24 is transmitted to supporting member 22 both by the bolts 26 and by the torque pins 42 which are closely fitted in holes 44 provided in the engaging portions of the supporting members.

Each of the supporting members 22 and 24 may include, as part of the structure, an adjustable bearing retainer, which facilitates axial adjustment of the bearings. In the illustrated construction, the outer portion 38 of support member 22 includes an adjustable portion 46, which is in threaded engagement with the remainder of the supporting member, and which engages a large diameter wheel bearing 50. The outer portion 38 of support member 24 includes an adjustable portion 48, which is in threaded engagement with the remainder of the supporting member, and which engages a large diameter wheel bearing 52.

Thus, the supporting members 22 and 24 provide axial and radial support for the relatively large diameter bearings 50 and 52, on which the wheel 14 rotates.

The wheel may utilize a box-section construction, and may be formed in two sections 54 and 56, as shown. The sections of the wheel are secured together by a plurality of bolts 58, and the hollow wheel section is strengthened by axially-extending ribs 60. The sides 62 and 64 of the wheel have openings 66 to reduce weight. The tire 16 is filled with air through the tire valve 68.

The brake is positioned in the cavity formed between the spaced outer portions 38 of the supporting members 22 and 24. The cooperating friction members of the brake are all located radially within the inner, or hub, diameter of the wheel; and the brake friction area is radially inside the bearings and entirely within the radial dimension of the supporting members 22 and 24. It is therefore possible to remove the wheel from the assembly without disturbing the brake, simply by taking off the outer bearing retainer 48.

The stator, or non-rotatable, portions of the brake are carried by the stationary supporting members 22 and 24. In the illustrated version of the invention, the brake is a disc brake, and there are three non-rotatable discs, or plates. The disc 70, to which brake lining 72 is secured, rests against the inside wall of supporting member 24, and the disc 74 at the opposite side of the brake, having lining 76 thereon, serves as the pressure plate. The third non-rotatable disc 78 is located between two rotatable discs 80 and 82 and has lining 84 and 86 on its opposite sides. The inner edge of each of the non-rotatable discs 70, 74, and 78 has a plurality of slots, by means of which the discs are keyed to anchor sleeves 88 carried by the bolts 26. Engagement of the slots in the discs with the anchor sleeves prevents the discs from rotating, although they are able to move axially along the anchor sleeves.

The rotors, or rotatable discs, or plates, 80 and 82 are keyed to the hub 90 of the wheel by means of a plurality of angularly-spaced axially-extending key members 92 which extend into slots in the outer edges of the discs. The key members 92 are short, hollow, rectangular cross-section bars which fit in channels 94 provided in the wheel hub and which are held against the hub by bolts 96. The key members 92 are secured to the wheel hub after the wheel and brake have been assembled, and the key members are removed prior to removal of the wheel.

The outer portion 38 of supporting member 22 provides a carrier for an axially movable brake actuating element, the supporting member having an annular chamber 98 formed therein, in which reciprocates an annular piston 100 adapted to exert an axial force against the brake discs to slow rotation of the wheel. The customary rubber sealing member 102 is carried by the piston. An inlet port 104, which is adapted to be connected by a suitable conduit to the fluid pressure source, allows fluid under pressure to enter chamber 98 to apply the brake. The outer portion 38 of supporting member 24 serves as the reaction member, or backing plate, of the brake, since it limits the axial movement of the several brake plates, thereby providing the axial reaction to the pressure of piston 100.

The pressure plate 74 and the piston 100 are urged toward released, or retracted, position by means of a plurality of angularly-spaced return springs 106, which are compressed between the pressure plate and the opposite disc 70. Adjustment of the pressure plate to compensate for lining wear is accomplished by turning the adjusting screws 108, each of which engages a nut 110 having a shoulder 112 resting against surface 114 and a toothed neck 116 which keeps it from rotating in opening 118.

From the foregoing it will be apparent that the present invention provides a wheel and brake assembly which is a radical departure from conventional designs. The wheel is mounted on large diameter bearings located radially beyond the brake. The brake is within the plane of the wheel, and radially within the inner diameter of the wheel hub. The same supporting members provide support for both the wheel and the brake, thereby avoiding the usual additive tendency of wheel and brake width, and permitting the narrow, large diameter wheel to be strongly made. The new construction allows the wheel to be removed without removing the brake, or permits the entire wheel and brake assembly to be handled as a unit.

Although a particular embodiment of my invention has been described, it will be understood by those skilled in the art that the objects of the invention may be attained by the use of constructions different in certain respects from that disclosed without departing from the underlying principles of the invention.

I claim:

1. In an aircraft landing gear having a strut provided with a mounting flange and with a laterally-extending stub axle, a wheel and brake assembly comprising a first annular brake-supporting member secured to the mounting flange and having a central opening through which the axle extends, a second annular brake-supporting member mounted alongside the first brake-supporting member and having a portion which is spaced from the corresponding part of the first brake-supporting member, a plurality of angularly-spaced fastening members securing the two brake-supporting members together, a plurality of anchor sleeves carried by said fastening members, one or more non-rotatable friction discs mounted between said brake-supporting members and having slots engaging said anchor sleeves to prevent rotation of said discs while permitting axial sliding movement thereof, two axially-spaced bearings, one supported axially and radially on the periphery of each of the brake-supporting members, a wheel rotatably mounted on said bearings, said wheel consisting of two sections joined together by a plurality of axially-extending fastening members, a plurality of angularly-spaced axially-extending key members secured to the hub of the wheel and located between the bearings, one or more rotatable friction discs having slotted engagement with said key members and inter-leaved with said non-rotatable discs, one of said brake-supporting members having an annular chamber adapted to be connected to a fluid pressure actuator, an annular piston reciprocable in said chamber, and a plurality of angularly-spaced springs compressed between the annular piston and the opposite brake-supporting member to tend to retain said piston in retracted position.

2. In an aircraft landing gear having a strut provided with a mounting flange and with a laterally-extending stub axle, a wheel and brake assembly comprising a first annular brake-supporting member secured to the mounting flange and having a central opening through which the axle extends, a second annular brake-supporting member mounted alongside the first brake-supporting member and having a portion which is spaced from the corresponding part of the first brake-supporting member, a plurality of angularly-spaced fastening members securing the two brake-supporting members together, one or more non-rotatable friction plates mounted between said brake-supporting members and keyed to at least one of the brake-supporting members to prevent rotation of said plates while permitting axial sliding movement thereof, two axially-spaced bearings, one supported axially and radially on the periphery of each of the brake-supporting members, a wheel rotatably mounted on said bearings, a plurality of angularly-spaced axially-extending key members secured to the hub of the wheel and located between the bearings, one or more rotatable friction plates keyed to said key members and inter-leaved with said non-rotatable plates, one of said brake-supporting members having a chamber adapted to be connected to a fluid pressure actuator, a piston reciprocable in said chamber, and one or more return springs arranged to tend to retain said piston in retracted position.

3. In an aircraft landing gear having a strut provided with a mounting flange and with a laterally-extending stub axle, a wheel and brake assembly comprising a first annular brake-supporting member secured to the mounting flange and having a central opening through which the axle extends, a second annular brake-supporting member mounted alongside the first brake-supporting member and having a portion which is spaced from the corresponding part of the first brake-supporting member, a plurality of angularly-spaced fastening members which secure the two brake-supporting members together, one or more non-rotatable friction plates mounted between and keyed to said brake-supporting members to prevent rotation of said plates while permitting axial sliding movement thereof, two axially-spaced bearings, one supported axially and radially on the periphery of each of the brake-supporting members, a wheel rotatably mounted on said bearings, a plurality of angularly-spaced axially-extending key members carried by the hub of the wheel and located between the bearings, one or more rotatable friction plates keyed to said key members and inter-leaved with said non-rotatable plates, one of said brake-supporting members having a chamber adapted to be connected to a fluid pressure actuator, a piston reciprocable in said chamber, the other of said brake-supporting members serving as the reaction member which limits axial movement of the brake plates and the piston, and one or more return springs arranged to tend to retain said piston in retracted position.

4. For use in an aircraft landing gear, a wheel and brake assembly comprising a first brake-supporting member having a generally plate-like structure, a second brake-supporting member mounted alongside the first brake-supporting member, the second brake-supporting member also having a generally plate-like structure and having a portion which is spaced from the corresponding part of the first brake-supporting member to provide a brake cavity, means for securing the two brake-supporting members together to prevent relative movement thereof, one or more non-rotatable friction plates mounted between and keyed to said brake-supporting members to prevent rotation of said plates while permitting axial sliding movement thereof, two axially-spaced bearings, one supported on each of the brake-supporting members at a circumference located radially outwardly beyond the brake friction area, a wheel rotatably mounted on said bearings, a plurality of angularly-spaced axially-extending key members carried by the hub of the wheel, one or more rotatable friction plates keyed to said key members and inter-leaved with said non-rotatable plates, one of said brake-supporting members having a chamber adapted to be connected to a fluid pressure actuator, a piston reciprocable in said chamber, and one or more return springs arranged to tend to retain said piston in retracted position.

5. For use in an aircraft landing gear, a wheel and brake assembly comprising a first brake-supporting member having a generally plate-like structure, a second brake-supporting member mounted alongside the first brake-supporting member, the second brake-supporting member also having a generally plate-like structure and having a portion which is spaced from the corresponding part of the first brake-supporting member, to provide a brake cavity, means for securing the two brake-supporting members together to prevent relative movement thereof, one or more non-rotatable friction plates mounted between and keyed to said brake-supporting members to prevent rotation of said plates while permitting axial sliding movement thereof, two axially-spaced bearings, one supported axially and radially by each of the brake supporting members, a wheel rotatably mounted on said bearings, one or more rotatable friction plates keyed to said wheel and interleaved with said non-rotatable friction plates, the brake friction area being radially inside the bearings and being entirely within the radial dimension of the brake-supporting members, and a brake actuating element supported by one of the brake-supporting members for reciprocable movement relative thereto, the other brake-supporting member serving as the reaction member which limits axial movement of the brake plates.

6. A wheel and brake assembly comprising a first brake-supporting member, a second brake-supporting member mounted alongside the first brake-supporting member and having an outer portion which is spaced from the corresponding part of the first brake-supporting member to provide a brake cavity, means for preventing relative axial movement of the two brake-supporting members, one or more non-rotatable friction plates mounted between and keyed to said brake-supporting members, two axially-spaced bearing, one supported axially and radially by each of the brake-supporting members, a wheel rotatably mounted on said bearing, one or more angularly-spaced axially-extending key members carried by the wheel and located between the bearings, one or more rotatable friction plates keyed to said key members and adapted to engage said non-rotatable plates, the brake friction area being radially inside the bearings and being entirely within the radial dimension of the brake-supporting members, and a brake actuating element supported by one of the brake-supporting members for reciprocable movement relative thereto, the other brake-supporting member serving as the reaction member which limits axial movement of the brake plates.

7. A wheel and brake assembly comprising a first brake-supporting member, a second brake-supporting member mounted alongside the first brake supporting member and having an outer portion which is spaced from the corresponding part of the first brake-supporting member, a plurality of angularly-spaced anchors provided by said brake-supporting members, one or more non-rotatable friction plates mounted between said brake-supporting members and keyed to said anchors, each of said brake supporting members having an annular outer portion which constitutes a bearing retainer, two axially-spaced bearings, one supported by each of the bearing retainers, a wheel rotatably mounted on said bearings, a plurality of angularly-spaced axially-extending key members carried by the hub of the wheel and located between the bearings, and one or more rotatable friction plates keyed to said key members and adapted to engage said non-rotatable plates, the brake friction area being radially inside the bearings.

8. A wheel and brake assembly comprising a first brake-supporting member, a second brake-supporting member mounted alongside the first brake supporting member and having an outer portion which is spaced from the corresponding part of the first brake-supporting member, a non-rotatable friction member mounted between and carried by said brake-supporting members, each of said brake supporting members having an annular outer portion which constitutes a bearing retainer, two axially-spaced bearings, one supported by each of the bearing retainers, a wheel rotatably mounted on said bearings, and a rotatable friction member carried by the hub of said wheel and adapted to engage the non-rotatable friction member, the brake friction area being entirely within the radial dimension of the brake-supporting members.

9. A wheel and brake assembly comprising a first brake-supporting member, a second brake-supporting member having parts corresponding to parts of said first brake-supporting member which are axially spaced apart, means for preventing relative rotational movement of said brake-supporting members, a non-rotatable friction member mounted between and carried by said brake-supporting members, two axially-spaced bearings, one supported on the periphery of each of the brake-supporting members, a wheel rotatably mounted on said bearings, a rotatable friction member carried by the hub of said wheel and adapted to engage the non-rotatable friction member, and a brake actuating element supported by one of the brake-supporting members for reciprocable movement relative thereto, the other brake-supporting member serving as the brake backing plate.

10. A wheel and brake assembly comprising a first wheel-and-brake-supporting member, a second wheel-and-brake-supporting member axially spaced from said first wheel-and-brake-supporting member, means for preventing relative rotational movement of said members, a non-rotatable friction member mounted between and carried by said supporting members, a wheel rotatably mounted on said supporting members, a rotatable friction member which rotates with the wheel and which is located between the supporting members, said rotatable friction member being adapted to engage the non-rotatable friction member to develop a frictional resistance to rotation of the wheel, the friction area being entirely within the radial dimension of said supporting members, and a brake actuating element mounted on one of said supporting members for reciprocable movement relative thereto, the other supporting member serving as the brake reaction member.

11. A wheel and brake assembly comprising a wheel-and-brake-supporting structure having axially-spaced generally plate-like portions which are relatively non rotatable and which provide between them a brake cavity, the peripheries of said axially-spaced portions providing wheel-bearings, a wheel rotatably mounted on said bearings, and a disc brake located in said brake cavity and having its friction area entirely within the radial dimensions of said plate-like portions.

12. A wheel and brake assembly comprising a wheel-and-brake-supporting structure having axially-spaced generally plate-like portions which are relatively immovable and which provide between them a brake cavity, the peripheries of said axially-spaced portions providing wheel-bearings, a wheel rotatably mounted on said bearings, and a disc brake located in said brake cavity between said axially-spaced plate-like portions and radially inside the inner circumference of the bearings.

13. A wheel and brake assembly comprising a wheel-and-brake supporting structure having axially-spaced plate-like portions which are relatively immovable and which provide between them a brake cavity, a wheel rotatably mounted on the peripheries of said plate-like portions, and a disc brake located in said brake cavity and entirely within the radial dimension of said supporting structure.

14. For use in an aircraft landing gear, a wheel and brake assembly comprising a first annular brake-supporting member, a second annular brake-supporting member mounted alongside the first brake-supporting member and having a portion which is spaced from the corresponding part of the first brake-supporting member, a plurality of angularly-spaced fastening members which secure the two brake-supporting members together, one or more non-rotatable friction plates mounted between and keyed to said brake-supporting members to prevent rotation of said plates while permitting axial sliding movement thereof, two axially-spaced bearings, one supported axially and radially by each of the brake-supporting members, a wheel rotatably mounted on said bearings, a plurality of angularly-spaced axially-extending key members carried by the hub of the wheel and located between the bearings, one or more rotatable friction plates keyed to said key members and adapted to engage said non-rotatable plates, one of said brake-supporting members having a chamber adapted to be connected to a fluid pressure actuator, a piston reciprocable in said chamber, and one or more return springs arranged to tend to retain said piston in retracted position.

15. For use in an aircraft landing gear, a wheel and brake assembly comprising a first annular brake-supporting member, a second annular brake-supporting member mounted alongside the first brake-supporting member and having a portion which is spaced from the corresponding part of the first brake-supporting member, a plurality of angularly-spaced fastening members which secure the two brake-supporting members together, one or more non-rotatable friction plates mounted between and keyed to said brake-supporting members to prevent rotation of said plates while permitting axial sliding movement thereof, two axially-spaced bearings, one supported axially and radially by each of the brake-supporting members, a wheel rotatably mounted on said bearings, a plurality of angularly-spaced axially-extending key members carried by the hub of the wheel and located between the bearings, one or more rotatable friction plates keyed to said key members and adapted to engage said non-rotatable discs, and a brake actuating element reciprocably mounted on one of said brake-supporting members, the other brake-supporting member serving as the reaction member which limits axial movement of the brake plates.

16. A wheel and brake assembly comprising a first brake-supporting member, a second brake-supporting member mounted alongside the first brake-supporting member and having an outer portion which is spaced from the corresponding part of the first brake-supporting member, a plurality of angularly-spaced fastening members which secure the two brake-supporting members together, one or more non-rotatable friction plates mounted between and keyed to said brake-supporting members, two axially-spaced bearings, one supported axially and radially by each of the brake-supporting members, a wheel rotatably mounted on said bearings, one or more angularly-spaced axially-extending key members carried by the hub of the wheel and located between the bearings, and one or more rotatable friction plates keyed to said key members and inter-leaved with said non-rotatable plates.

17. A wheel and brake assembly comprising a first brake-supporting member, a second brake-supporting member mounted alongside the first brake supporting member and having an outer portion which is spaced from the corresponding part of the first brake-supporting member, a plurality of angularly-spaced anchors provided by said brake-supporting members, one or more non-rotatable friction plates mounted between said brake-supporting members and keyed to said anchors, two axially-spaced bearings, one supported axially and radially by each of the brake-supporting members, a wheel rotatably mounted on said bearings, a plurality of angularly-spaced axially-extending key members carried by the hub of the wheel and located between the bearings, and one or more rotatable friction plates keyed to said key members and inter-leaved with said non-rotatable plates.

18. A wheel and brake assembly comprising a first brake-supporting member, a second brake-supporting member mounted alongside the first brake-supporting member and having an outer portion which is spaced from the corresponding part of the first brake-supporting member, a non-rotatable friction disc mounted between and carried by said brake-supporting members, two axially-spaced bearings, one supported on the periphery of each of the brake-supporting members, a wheel rotatably mounted on said bearings, and a rotatable friction disc carried by the hub of said wheel and adapted to engage the non-rotatable friction disc, the brake friction area being radially inside the bearings and entirely within the radial dimension of the brake-supporting members.

19. A wheel and brake assembly comprising a non-rotatable plate-like brake-supporting member, a plurality of angularly-spaced anchors arranged to extend axially away from said brake-supporting member, a non-rotatable backing plate spaced from said brake-supporting member and being secured to said anchors, one or more non-rotatable friction plates mounted between said brake-supporting member and said backing plate and being keyed to said anchors, a wheel, means supporting said wheel for rotation including a bearing supported on the outer periphery of said brake-supporting member, a plurality of angularly-spaced axially-extending key members carried by the hub of said wheel, and one or more rotatable friction members keyed to said key members and arranged to frictionally engage said non-rotatable plates, the friction area of said plates and said friction members being within the radial dimension of said bearing to the extent that the wheel may be removed from the assembly without interference from either said friction plates or said friction members.

20. A wheel and brake assembly comprising a non-rotatable brake-supporting disc, a wheel, means supporting said wheel for rotation including a bearing carried on the outer periphery of said disc, a non-rotatable brake reaction member spaced from and having rigid connection with said disc, rotatable and non-rotatable friction members interposed between said disc and said reaction member for operative engagement with the latter and adapted to be frictionally engaged to inhibit rotation of said wheel, the friction area of said friction members being located radially inside said bearing, and a hydraulic brake actuating device in substantially the same vertical plane as said bearing and carried by said disc and actuable to cause frictional engagement of said friction members.

21. A wheel and brake assembly comprising a non-rotatable annular brake-supporting disc, a wheel, means rotatably supporting said wheel with respect to said disc, a non-rotatable brake reaction member spaced from and having rigid connection with said disc, rotatable and non-rotatable friction members interposed between said disc and said reaction member for operative engagement with the latter and adapted to be frictionally engaged to inhibit rotation of said wheel, the friction area of said friction members being radially inside said means, and a hydraulic brake actuating device in substantially the same vertical plane as said bearing and carried by said disc, said device being disposed radially inside said means and actuable to cause frictional engagement of said friction members.

22. For use in a wheel and brake assembly a combination wheel and brake-supporting device comprising a generally disc-like member, a bearing mounted on the outer periphery of said member, and hydraulic brake actuating means carried by said member in substantially the same vertical plane of said bearing, said actuating means comprising a fluid pressure chamber in said member, and a fluid pressure responsive piston in said chamber.

23. A wheel and brake assembly comprising a non-rotatable brake-supporting member, a plurality of angularly-spaced anchors arranged to extend axially away from said brake-supporting member, a non-rotatable backing plate spaced from said brake-supporting member and being secured to said anchors, one or more non-rotatable friction plates mounted between said brake-supporting member and said backing plate and being keyed to said anchors, a wheel, means supporting said wheel for rotation including a bearing supported on the outer periphery of said brake-supporting member, a plurality of angularly-spaced axially-extending key members carried by said wheel, and one or more rotatable friction members keyed to said key members and arranged to frictionally engage said non-rotatable plates, the friction area of said plates and said friction members being within the radial dimension of said bearing to the extent that the wheel may be removed from the assembly without interference from either said friction plates or said friction members.

WILLIAM H. DU BOIS.

REFERENCES CITED

The following references are of record in the file of this patent:

UNITED STATES PATENTS

| Number | Name | Date |
|---|---|---|
| Re. 21,984 | Hirsch et al. | Dec. 23, 1941 |
| 698,181 | Doney | Apr. 22, 1902 |
| 797,084 | Sturgess | Aug. 15, 1905 |
| 1,356,052 | Duchesne | Oct. 19, 1920 |
| 1,412,393 | Enstrom | Apr. 11, 1922 |
| 1,904,186 | Whitney | Apr. 18, 1933 |
| 1,988,888 | Avery | Jan. 22, 1935 |
| 2,006,387 | Eksergian | July 2, 1935 |
| 2,054,583 | Delawal-Crow | Sept. 15, 1936 |
| 2,097,942 | Whitney | Nov. 2, 1937 |
| 2,283,687 | Mercier | May 19, 1942 |
| 2,303,041 | Glacy | Nov. 24, 1942 |
| 2,381,166 | Hollerith | Aug. 7, 1945 |
| 2,423,011 | Du Bois | June 24, 1947 |

FOREIGN PATENTS

| Number | Country | Date |
|---|---|---|
| 321,479 | Italy | Oct. 6, 1934 |
| 693,109 | France | Aug. 30, 1930 |
| 528,219 | Germany | June 26, 1931 |
| 482,791 | Great Britain | Apr. 5, 1938 |